United States Patent
Churin et al.

(10) Patent No.: US 7,853,603 B2
(45) Date of Patent: Dec. 14, 2010

(54) USER-DEFINED RELEVANCE RANKING FOR SEARCH

(75) Inventors: Denis Churin, Sammamish, WA (US); Jingwei Lu, Redmond, WA (US); Nimish Khanolkar, Kirkland, WA (US); Sundaram Narayanan, Issaquah, WA (US); Tapas Nayak, Sammamish, WA (US); Feng Tian, Shandong (CN)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 11/805,380

(22) Filed: May 23, 2007

(65) Prior Publication Data

US 2008/0294620 A1 Nov. 27, 2008

(51) Int. Cl.
*G05F 17/30* (2006.01)
(52) U.S. Cl. ..................... 707/755; 707/748
(58) Field of Classification Search ............. 707/1–10, 707/723, 724, 748–780
See application file for complete search history.

(56) References Cited

U.S. PATENT DOCUMENTS

| | | | |
|---|---|---|---|
| 5,802,515 A | 9/1998 | Adar et al. | |
| 5,806,061 A | 9/1998 | Chaudhuri et al. | |
| 6,012,053 A | 1/2000 | Pant et al. | |
| 6,326,962 B1 * | 12/2001 | Szabo | 715/762 |
| 7,080,064 B2 | 7/2006 | Sundaresan | |
| 7,158,989 B2 | 1/2007 | Saltz | |
| 7,181,438 B1 * | 2/2007 | Szabo | 707/2 |
| 2001/0039544 A1 | 11/2001 | Chakrabarti et al. | |
| 2004/0039734 A1 | 2/2004 | Judd et al. | |
| 2005/0038775 A1 | 2/2005 | Haveliwala et al. | |
| 2005/0060311 A1 | 3/2005 | Tong et al. | |
| 2005/0177551 A1 * | 8/2005 | Rathakrishnan et al. | 707/2 |
| 2005/0222975 A1 | 10/2005 | Nayak et al. | |
| 2006/0064411 A1 | 3/2006 | Gross et al. | |
| 2006/0218146 A1 | 9/2006 | Bitan et al. | |
| 2007/0156677 A1 * | 7/2007 | Szabo | 707/5 |

FOREIGN PATENT DOCUMENTS

CA 2550818 3/2007

OTHER PUBLICATIONS

Microsoft Dictionary, 5th edition, p. 149, copyright 2002.*
Aleman-Meza, et al., "Context-Aware Semantic Association Ranking", Date: Aug. 21, 2003, pp. 1-18, Technical Report 03-010, LSDIS Lab, Computer Science, University of Georgia, U.S.A.
Efthimiadis Efthimis N.,"A User-Centred Evaluation Of Ranking Algorithms For Interactive Query Expansion", Date: 1993, pp. 146-159, Pittsburgh, PA, U.S.A.
Joachims Thorsten,"Optimising Search Engines Using clickthrough Data", Date: 2002, pp. 133-142, Edmonton, Alberta, Canada.

(Continued)

*Primary Examiner*—Wilson Lee

(57) ABSTRACT

Detailed herein is a technology which, among other things, allows a search engine to utilize a user-defined relevance function. In one approach to the technology, a method of applying a user-defined relevance function is described. In this approach, a complex search query is decomposed into a simple operator. The simple operator is associated with the user-defined relevance function. A document which matches the search query is retrieved, and a rank is calculated for the document, using the user-defined relevance function.

21 Claims, 5 Drawing Sheets

Query Tree 471

OTHER PUBLICATIONS

Seidl, et al.,"Efficient User-Adaptable Similarity Search in Large Multimedia Databases", Date: 1997, pp. 506-515, Athens, Greece.

International Search Report and Written Opinion for International Application No. PCT/US2008/063991 dated Sep.. 29, 2008, 11 pages.

* cited by examiner

| <dockey> | <document> |
|---|---|
| 212 | ...apples, oranges, grapes, pears.... 214 |
| 222 | ...apples, grapes.... 224 |
| 232 | ...oranges, grapes, pears.... 234 |
| 242 | ...apples, oranges, pears.... 244 |
| 252 | ...oranges, pears.... 254 |
| 262 | ...apples, bananas, oranges, grapes, figs, pears.... 264 |

Database Table 200

FIG. 2

Flowchart 300

400
SELECT * FROM T, CONTAINSTABLE(T.document, 'apples AND oranges OR grapes AND pears') CT on T.ftkey=CT.FTKEY Query 400

Tree 401

USER-DEFINED RELEVANCE RANKING FOR SEARCH

BACKGROUND

One of the fundamental problems of digital information is how to effectively sort through tremendous volumes of data, in order to find those pieces of information which are most relevant, at any given time. Search engines include a relevance or ranking function, in order to address this issue. These relevance functions are used to give differing weights to documents which needs the search criteria; the weights, or ranks, assigned can then be used to further manipulate the pool of information, e.g., by displaying results in a certain order.

Many search engines, particularly those used for interaction with databases, use some variation on a tf-idf weight scheme, where the frequency of the occurrence of a term in a particular document is weighed against the inverse document frequency, a measure of how often the term appears in the pool of documents. Different search engines will implement different variations on the scheme, with the individual search engine optimized to use its particular relevance function.

SUMMARY

Detailed herein is a technology which, among other things, allows a search engine to utilize a user-defined relevance function. In one approach to the technology, a method of applying a user-defined relevance function is described. In this approach, a complex search query is decomposed into a simple operator. The simple operator is associated with the user-defined relevance function. A document which matches the search query is retrieved, and a rank is calculated for the document, using the user-defined relevance function.

In another approach to the technology, a computer-readable medium having computer-executable instructions is described. In this approach, a user-defined ranking function is received, and a search query is received. The search query is decomposed into a number of simple operations. Each of these simple operations is associated with a relevance function. A number of results are retrieved, corresponding to the simpler operations, and a rank is calculated for each of these results, using the associated relevance functions.

In another approach to the technology, a system, having a bus, a processor, a memory, and a data storage device, is configured to receive a complex search query. The system is further configured to parse this complex search query into several simpler operations. The system is also configured to retrieve results corresponding to these simpler operations, and to compute a rank for each of the results by applying a user-defined relevance function.

Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

FIG. 2 is an example database table upon which embodiments may be implemented.

DETAILED DESCRIPTION

Figure 1:
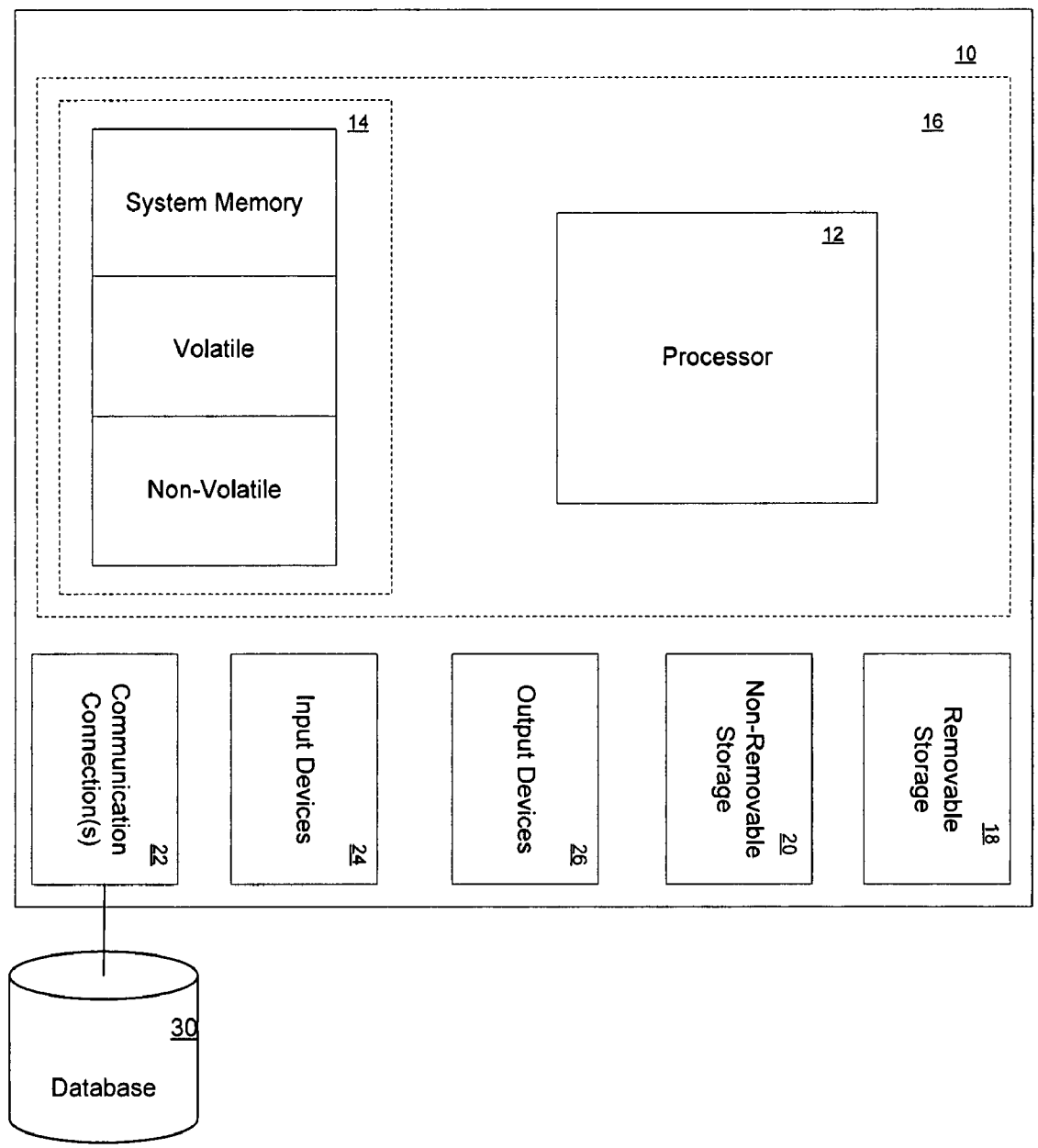
FIG. 1 is a block diagram of an exemplary computing system upon which embodiments may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 3) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system environment 10, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Basic Computing Device

With reference to FIG. 1, an exemplary system for implementing embodiments includes a general purpose computing system environment, such as computing system environment 10. In its most basic configuration, computing system environment 10 typically includes at least one processing unit 12 and memory 14. Depending on the exact configuration and type of computing system environment, memory 14 may be volatile (such as RAM), non-volatile (such as ROM, flash memory, etc.) or some combination of the two. This most basic configuration is illustrated in FIG. 1 by dashed line 16. Additionally, computing system environment 10 may also have additional features/functionality. For example, computing system environment 10 may also include additional storage (removable and/or non-removable) including, but not limited to, magnetic or optical disks or tape. Such additional storage is illustrated in FIG. 1 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and nonremovable storage 20 are all examples of computer storage media.

Computing system environment 10 may also contain communications connection 22 that allow it to communicate with other devices. Communications connection 22 is an example of communication media. In the depicted embodiment, computing system environment 10 is shown as communicating with database 30, through communications connection 22. The nature and contents of database 30 may vary, across different embodiments. Moreover, in some embodiment, database 30 may be an internal database, e.g., implemented within removable storage 18 and/or nonremovable storage 20.

Computing system environment 10 may also have input device(s) 24 such as a keyboard, mouse, pen, voice input device, touch input device, etc. Output device(s) 26 such as a display, speakers, printer, etc. may also be included. Specific embodiments, discussed herein, combine touch input devices with a display, e.g., a touch screen. All these devices are well known in the art and need not be discussed at length here.

User-Defined Relevance Functions

While relevance functions are both a necessary and valuable part of a search engine, a single relevance function may not be suitable for every situation. As described in the following embodiments, it would be valuable to have a search engine which allows the user to modify the relevance function being applied by the search engine. Further, in some embodiment, the user may be able to completely replace some or all of the relevance function, in order to tailor the search engine to better reflect the user's particular needs.

Accordingly, in the embodiments that follow, an approach is described that allows a user to specify a ranking function for use with a search engine. In some embodiments, this is accomplished by exposing the basic building blocks of relevance functions, e.g., multiway merge join logical operators, to the writer of the ranking function.

Database Tables

With reference now to FIG. 2, an exemplary database table 200 is depicted, in accordance with one embodiment. While database table 200 is shown as incorporating specific, enumerated features and elements, it is understood that embodiments are well suited to applications involving additional, fewer, or different features or elements. In particular, while database table 200 is shown to be a simple table containing only two columns, it is understood that embodiments are suitable for applications across a wide range of search types and data types.

Database table 200 shown as including a number of database rows or entries, e.g., rows 210 through 260. Each database row includes a document key column, e.g., dockey 212, which contains a unique identifier for the document stored in that row. Each database row also includes a document column, e.g., document 214, which contains the document text for the document corresponding to that particular dockey. In the depicted embodiment, several document column entries are shown as including several terms, which will be used to illustrate further examples, below.

Relevance Functions

In different embodiments, different types of queries or searches are accepted. For example, in one embodiment, Boolean searches are supported, e.g., searches combining terms using Boolean logic operators such as AND, OR, or AND NOT. In another embodiment, vector specification is supported, e.g., searching for multiple terms, with different weights assigned to some or all of the terms. In another embodiment, e.g., a web search, the final ranking of a returned search document may depend in part upon outside considerations, e.g., metadata, associated with the document. Another embodiment, other approaches to search are utilized.

In many applications, it is advantageous for the user to be able to manipulate or modify the relevance function applied by a search engine, rather than relying upon the relevance function built into the particular search engine. For example, the user may choose to apply different relevance functions to different scenarios or datasets, or can modify the ranking function, so as to alter the ranking applied to search results to meet some desirable criteria. This freedom to manipulate offers advantages to the user.

In some embodiments, a user may elect to supply several ranking functions, corresponding to different available operators. For example, when dealing with Boolean logic operators, the user may supply separate relevance functions for the AND and OR operators. Further, in several such embodiments, a default relevance function may be supplied with the search engine, for use with operators not overridden by a user provided relevance function.

Applying a User-Defined Relevance Function

Figure 3:
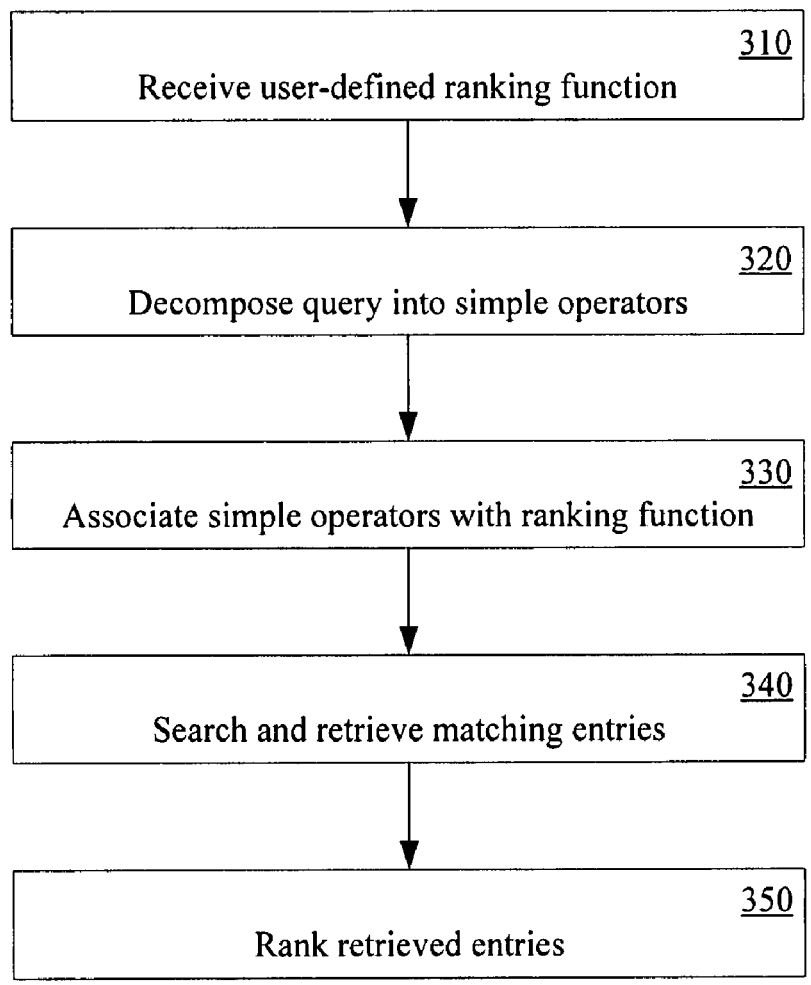
FIG. 3 is a flowchart of a method of applying a user-defined relevance function, in accordance with one embodiment.

With reference now to FIG. 3, a flowchart 300 of a method of applying a user-defined relevance function is depicted, in accordance with one embodiment. Although specific steps are disclosed in flowchart 300, such steps are exemplary. That is, embodiments are well suited to performing various other (additional) steps or variations of the steps recited in flowchart 300. It is appreciated that the steps in flowchart 300 may be performed in an order different than presented, and that not all of the steps in flowchart 300 may be performed.

With reference now to step 310, a user specified ranking function is received. In different embodiments, different methods of supplying such a relevance function are utilized. For example, in some embodiments, a user may supply a relevance function written in a programming language, e.g., T-SQL. In several such embodiments, a declarative language, e.g., SQL or a dialect, is used for the user-defined relevance function. Also, in different embodiments, the operation of the ranking function may vary. For example, in one embodiment, the ranking function may apply to the Boolean operator AND, and apply a TF-IDF scheme to search results.

With reference now to step 320, a query is decomposed. In some embodiments, a complex query is decomposed into a tree of simpler operators. In some other embodiments, a query is decomposed into several simpler operations. For example, in one embodiment, a fulltext query is separated into a tree comprising several simple operations, connected by joins. In such an embodiment, the type of joining is based on the logical operator connecting the simple operations. For example, AND is treated as an inner join, OR is treated as an outer join, and AND NOT is handled as not exists. In some embodiments, each of the simpler operations contains homogenous logical operators, e.g., only ANDs or ORs. In one such embodiment, ranked functions for homogenous logical operators are treated as commutative.

With reference now to step 330, a simple operation is associated with a ranking function. In some embodiments, the simple operation may be associated with the user supplied ranking function. In several embodiments, a simple operation may be linked with a user supplied ranking function, if one is available, or with a default ranking function. In some embodiments, ranking functions have a common signature, and use the language element for index accesses as a fundamental tool; in such embodiments, context information is provided for the ranking function, which is passed in turn to the elements that performs the index accesses. Moreover, context information can be passed to other table valued functions (TVFs), to obtain information important to the rank function, but not present in the index.

With reference now to step 340, a search is performed, and corresponding results are retrieved. In different embodiments, this search and retrieve operation is performed in different ways. It is understood that embodiments are well suited to applications with many different approaches to both search and result retrieval. In some embodiments, the results retrieved include the information necessary for a relevance function to compute ranking for the results. Such information may include elements such as document count, term frequency, term weight, and other information. In some embodiments, multiple searches are performed, using the decomposed simple operations described above. In one such embodiment, supplying context information allows an index accesses element to retrieve the rows that match the partial query corresponding to the simpler operation.

With reference now to step 350, retrieved results are ranked, according to the appropriate ranking function or functions. In some embodiments, the ranking functions use standard SQL programming constructs, such as aggregates and scalar user defined functions, to compute the score for each document.

In some embodiments, query decomposition and the association of ranking functions with simple operators is performed during a compile phase, while search, retrieval, and ranking are performed during a run-time phase. In other embodiments, the timing of these operations may vary.

Streaming Table Valued Functions

In some embodiments, which implements the above-described method, index accesses provided using a streaming table valued function (STVF). In such an embodiment, use of an STVF provides certain advantages. Among these is an efficient implementation for multiway ANDs and ORs over the inverted index, as well as efficient inversion, with the output sorted in increasing document identifier order, even if the document identifier is an inner column in an inverted index. In other embodiments, other search result ordering, e.g., relevance order, may be utilized. Further, using an STVF allows for decompression at different levels, based on user requests, e.g., decompressing at level 1 for document identifier decompression, or level 2 for occurrence decompression. Additionally, the use of an STVF allows for efficient retrieval of information required for ranking, e.g., document count, term frequency, term weight, or column weight. Moreover, using an STVF allows for accurate cardinality estimates, which, in turn, allows for effective optimization by the database query optimizer.

Decomposition of a Query

Figures 4A, 4B:
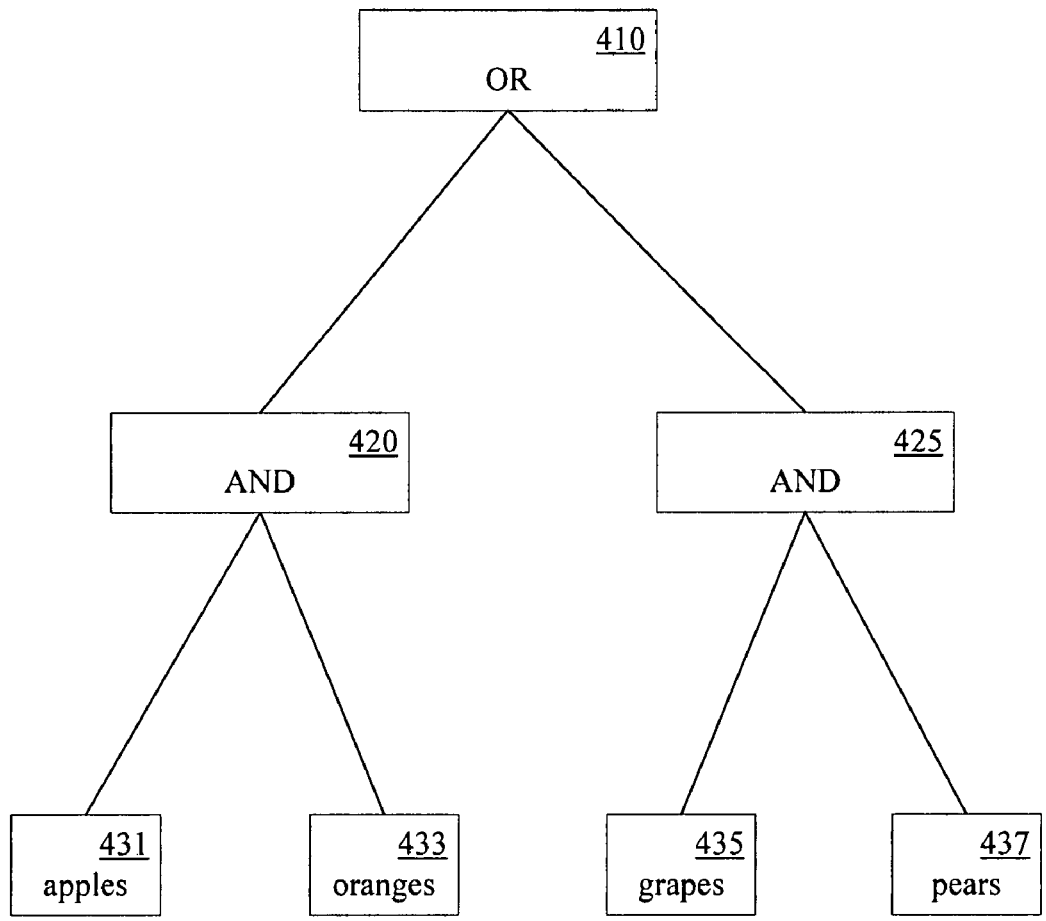
FIG. 4A is an example database query, in accordance with one embodiment.
FIG. 4B is a depiction of a search tree, in accordance with one embodiment.

With reference now to FIG. 4A, an example database query 400 is depicted, in accordance with one embodiment. While query 400 is shown as incorporating specific, defined elements, is understood that embodiments are well suited to applications involving additional, fewer, or different elements, or featuring different arrangements of elements.

Query 400, in the depicted embodiment, is shown as a fulltext query directed at an SQL database. In this embodiment, query 400 goes through a number of transformations, structured in a manner such that the query is reduced to several simpler operations, and allows for the inclusion of user supplied ranking functions.

In the depicted embodiment, T is a database table, such as table 200. Document and dockey are columns within the database table. The search string, in the depicted embodiment, is 'apples AND oranges OR grapes AND pears.' CONTAINSTABLE is a T-SQL TVF that returns rows qualifying the search string, as well as the rank of a document with respect to this search string. In the depicted embodiment, the query instructs the search engine to return all rows of table T and their rank value, where the document column contains both keywords apples and oranges, or both keywords grapes and pears.

In one embodiment, the query is parsed and bound. During the process of parsing and binding, the CONTAINSTABLE function is identified, and the fulltext query compiler is invoked to process the search string. The fulltext query compiler transforms the search string into a tree that represents query keywords and logical operators binding them. One such tree, tree 401, is depicted in FIG. 4B.

As shown in tree 401, the search string from query 400 has been transformed into a tree structure. Tree 401 is organized such that logical operators bind elements of the tree which are associated by the search string. In this way, OR 410 binds AND 420 with AND 425. AND 420, in turn, binds apples 431 with oranges 433, while AND 425 binds grapes 435 with pears 437.

In some embodiments, after the search string has been reduced to a simplified tree structure, homogenous logical operators are identified, such as AND and OR operators. In several such embodiments, the homogenous logical expressions binding simple terms, e.g., keywords, are transformed into multiway skip merge join operators implemented as an STVF. One such embodiment is depicted in FIG. 4C, as intermediary tree 441.

As shown in intermediary tree 441, the AND printings of tree 401 have been replaced with multiway skip merge join operators implemented as STVFs. OR 450 now binds elements 460 and 465, each of which is a multiway skip merge join operator.

In some embodiments, after a query has been transformed in this manner, the system will load the ranking functions provided by the user for the appropriate operators. For example, with reference to intermediary tree 441, the system would load the ranking functions provided by the user for the AND operator. During the compilation of the ranking function, the system would insert the actual multiway merge join operators as appropriate. In some embodiments, where no ranking function is provided by the user for a particular operator, a default system provided function is loaded and compiled instead.

Figure 4C:
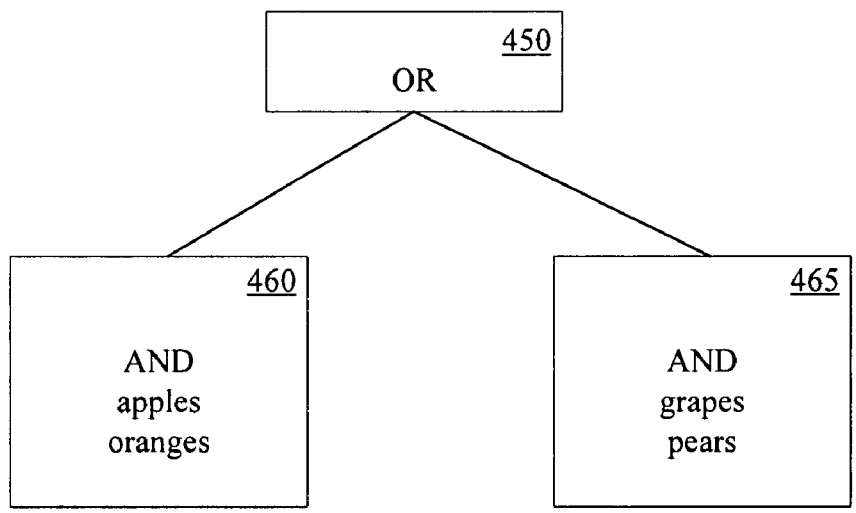
FIG. 4C is a depiction of an intermediary search tree, in accordance with one embodiment.

The rank values returned by the ranking functions are then combined at a higher level, e.g., at the level of OR 450 in FIG. 4C. In some embodiments, this combination is handled by a default system operation, e.g., computing the combined rank as a maximum, in the case of the OR operator, or as a minimum, in the case of the AND operator. In other embodiments, the user may provide a user-specified combination function, in a manner analogous with the user-specified rank function.

Figure 4D:
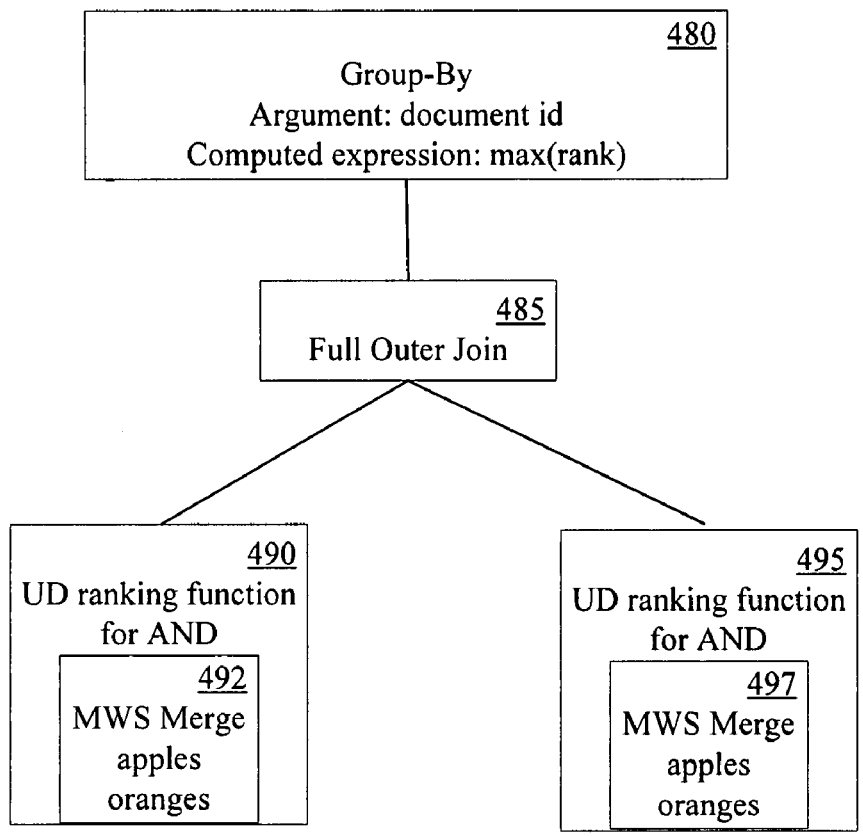
FIG. 4D is a depiction of a query tree, in accordance with one embodiment.

In FIG. 4D, a query tree 471 is depicted, in accordance with one embodiment. Query tree 471 shows the final state of query 400, with a combination function such as that described above. In the depicted embodiment, the non-leaf nodes in the fulltext query tree are transformed to relational operators, e.g., inner join for AND, outer join for OR, or semi-join for AND NOT. As depicted, OR 450 has been replaced by outer join 485. Ranking functions 490 and 495 has been loaded for multiway skip merge join operators 492 and 497, respectively. Block 480 depicts the combination function, shown here as a maximum of the returned rank values of ranking functions 490 and 495.

In some embodiments, this query tree is incorporated into an overall SQL query, and optimized as a whole. In several such embodiments, this optimization ensures that the user-defined ranking function, however complex, is optimized by the system to the same degree as if it were part of the user provided query.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of applying a user-defined relevance function comprising:
   decomposing a complex search query into a plurality of simple operations that are connected by joins, the plurality of simple operations including a simple operator that includes homogeneous logical expressions;
   receiving a user-defined relevance function written in a structured query language (SQL) language from a user;
   associating said simple operator with said user-defined relevance function to override a default relevance function previously associated with the simple operator;
   retrieving a matching document matching said complex search query, including using a streaming table valued function (STVF) to perform index access to produce one or more rows that match a partial query corresponding to the simple operator, the rows corresponding to documents matching the partial query; and
   computing a rank for said matching document, using said user-defined relevance function.

2. The method of claim 1, further comprising:
   searching a database for said matching document.

3. The method of claim 1, wherein said matching document comprises information used by said user-defined relevance function for calculating said rank.

4. The method of claim 1, wherein said computing comprises said user-defined relevance function using information associated with said matching document to compute said rank.

5. The method of claim 1, wherein said decomposing comprises transforming homogenous logical expressions into a multiway skip merge join operator.

6. The method of claim 1, wherein said complex search query comprises a Boolean logic query.

7. The method of claim 1, wherein said decomposing comprises decomposing said complex search query into a tree of operators.

8. A computer-readable medium that includes computer storage media having computer-executable instructions for performing steps comprising:
   receiving a user-defined ranking function written in a structured query language (SQL) language from a user;
   receiving a search query;
   decomposing said search query into a plurality of simple operations that are connected by joins, the plurality of simple operations including a simple operator that includes homogeneous logical operators;
   associating each of said plurality of simple operations with said user-defined ranking function to override one or more default ranking functions previously associated with the plurality of simple operations;
   retrieving a plurality of results corresponding to said plurality of simple operations, including using a streaming table valued function (STVF) to perform index access to produce one or more rows that match a partial query corresponding to the simple operator, the rows corresponding to documents matching the partial query; and calculating a rank for each of said plurality of results, using said user-defined ranking function.

9. The computer-readable medium of claim 8, further comprising:

receiving a plurality of user-defined ranking functions; and associating said plurality of user-defined ranking functions with said plurality of simple operations.

10. The computer-readable medium of claim 8, further comprising:

combining said ranks for said plurality of results to produce an overall rank for each of said plurality of results.

11. The computer-readable medium of claim 10, wherein said combining comprises:

computing a maximum rank value from said ranks for said plurality of results.

12. The computer-readable medium of claim 8, wherein said decomposing comprises:

transforming said search query into a search tree;

identifying homogenous logical operators in said search tree; and transforming said homogenous logical operators into a multiway skip merge join operator.

13. The computer-readable medium of claim 12, wherein said multiway skip merge join operator comprises a STVF.

14. The computer-readable medium of claim 8, wherein said search query comprises a vector query.

15. The computer-readable medium of claim 14, wherein said vector query comprises a plurality of keywords, and each keyword is associated with a search weight.

16. A system comprising:

a bus;

a processor, coupled to said bus, for processing information;

a memory, coupled to said bus, for storing information; and a data storage device, coupled to said bus, for storing information, wherein said system is configured to receive a complex search query, parse said complex search query into a plurality of simpler operations that are connected by joins, the plurality of simple operations including a simple operator that includes homogeneous logical operators, to retrieve a plurality of results corresponding to said plurality of simpler operations, including using a streaming table valued function (STVF) to perform index access to produce one or more rows that match a partial query corresponding to the simple operator, the rows corresponding to documents matching the partial query, and to compute a rank for each of said plurality of results by applying a user-defined relevance function written in a structured query language (SQL) language and supplied by a user to override a default relevance function previously associated with a simpler operation of the plurality of simpler operations.

17. The system of claim 16, wherein said system is configured to parse said complex search query by reducing said complex search query to a search tree, transforming homogenous logical operators in said tree to multiway skip merge join operators, and transforming non-leaf nodes of said search tree into relational operators.

18. The system of claim 17, further configured to optimize said user-defined relevance function as part of said search tree.

19. The system of claim 16, wherein said user-defined relevance function comprises a function written in a declarative language.

20. The method of claim 1, wherein said computing comprises:

computing the rank for said matching document using a default relevance function with respect to a second simple operator decomposed from the complex search query.

21. The system of claim 16, wherein the system is configured to compute the rank for each of the plurality of results by applying a default relevance function to a second simpler operation of the plurality of simpler operations.

* * * * *